United States Patent [19]

Kawata

[11] Patent Number: 4,933,614
[45] Date of Patent: Jun. 12, 1990

[54] MOTOR DRIVE CONTROL CIRCUIT

[75] Inventor: Toshihiko Kawata, Furukawa, Japan

[73] Assignee: Alps Electric Co., Ltd., Tokyo, Japan

[21] Appl. No.: 295,953

[22] Filed: Jan. 11, 1989

Related U.S. Application Data

[63] Continuation-in-part of Ser. No. 183,541, Apr. 14, 1988, abandoned, which is a continuation of Ser. No. 6,484, Jan. 23, 1987, abandoned.

[51] Int. Cl.$^5$ .............................................. H02P 7/00
[52] U.S. Cl. ................................... 318/432; 388/821; 388/929; 388/930; 62/133
[58] Field of Search ...................... 318/432, 139, 433; 388/800, 821, 833, 815, 847, 929, 930; 62/133; 236/35, DIG. 9

[56] References Cited

U.S. PATENT DOCUMENTS

4,044,287  8/1977  Ratzel et al. ...................... 318/432
4,415,790  11/1983  Diesch et al. ...................... 219/492

Primary Examiner—William M. Shoop, Jr.
Assistant Examiner—David Martin
Attorney, Agent, or Firm—Guy W. Shoup; Paul J. Winters

[57] ABSTRACT

A blower motor drive control circuit is configured to maintain a fixed value of motor driving current to maintain a constant amount of air supply from an air conditioner regardless of changes in the amount of intake air.

2 Claims, 4 Drawing Sheets

MOTOR DRIVE CONTROL CIRCUIT

This Application is a continuation in part of my copending U.S. patent application Ser. No. 07/183,541, filed Apr. 14, 1988, which is a continuation of U.S. patent application Ser. No. 07/006,484, filed Jan. 23, 1987, both now abandoned.

FIELD OF THE INVENTION

This invention relates to an apparatus for controlling rotation of DC motor for a blower to control an amount of blowing of a blower motor to be used in an automobile air conditioner and the like, and more particularly an apparatus for controlling rotation of DC motor for blower improved in such a way as a specified amount of blowing air may be attained in respect to a set value of a blowing amount.

BACKGROUND OF THE INVENTION

Prior art blower motors are driven by a fixed driving voltage to rotate at a fixed number of revolutions to provide a desired amount of blast corresponding to the number of revolutions. The amount of intake air entering in the blower motor from the exterior air largely changes with the velocity of the car. A blower motor of this type is used in a car air conditioner disclosed in U.S. Pat. No. 4,482,009.

Changes in the amount of intake air cause that the blower motor driven at a fixed number of revolutions provides a variable total air supply because the total air supply is the sum of a fixed air supply responsive to the revolution of the blower motor and the variable intake air. A d.c. motor control circuit involving this problem is disclosed in U.S. Pat. No. 4,458,186.

Figure 7:
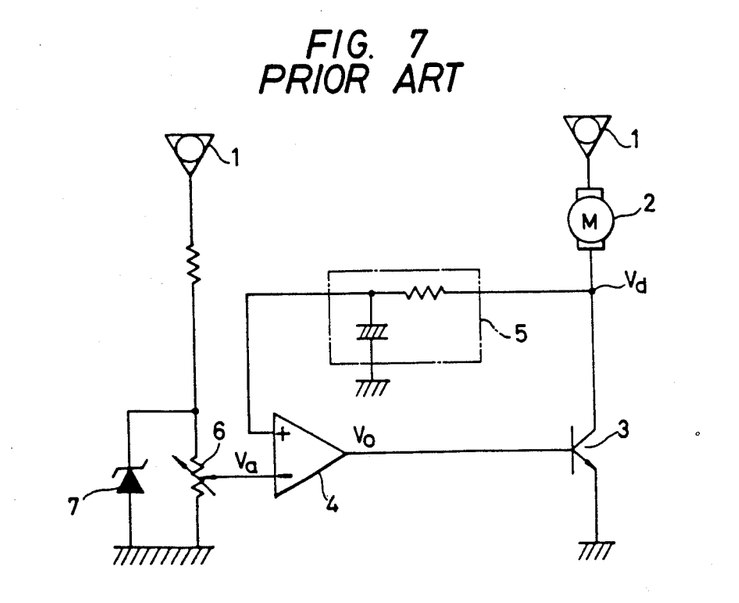
FIG. 7 is a circuit diagram for showing a conventional type of a blower driving control device.

A conventional type of an apparatus for controlling rotation of DC motor having the above-mentioned problems will be described in reference to FIG. 7.

A blower motor 2 for Dc driving to be connected to an anode of a battery 1 is energized and driven with a driving transistor 3. To the base of this transistor 3 is connected an output terminal of an operation amplifier 4, and to a non-inverted input terminal (+) of the operation amplifier 4 is supplied a sensing voltage Vd divided between the collector of the transistor 3 from a common connection point between the collector of the transistor 3 and the motor 2 to between the collector and the emitter of the transistor 3. To the inverted input terminal (−) of this operation amplifier 4 is supplied a reference voltage Va from a sliding contact terminal of a variable resistor 6 for use in setting a value. To one side of the fixed terminal arranged in this variable resistor 6 is applied a voltage through a resistor for limiting a variable range of the reference voltage Va from a battery 1. The other side of the fixed terminal arranged in this variable resistor 6 is connected to the ground. To a common connection point between a resistor for limiting a variable range of the reference voltage Va and one side of the fixed terminal arranged at the variable resistor 6 is connected a cathode of Zener diode 7 for preventing a variation amount of power supply voltage from influencing against the reference voltage Va, and its anode is connected to the ground. A cathode of the battery 1 not shown is connected to the ground and a power supply voltage is supplied from this battery 1 to an anode power supply terminal (not shown) of the operation amplifier 4 for performing a differential amplification. A cathode supplying terminal of a power supply (not shown) of this operation amplifier is connected to the ground. This operation amplifier 4 is constructed such that circuit elements for setting a differential amplifying operation (not shown) to the output terminal and the input terminal are provided.

Now, a sensing voltage Vd which is also a potential at a common connection point between the motor 2 and the transistor 3 applied to both ends of the motor 2 and outputted in correspondence with a load condition of the motor 2 has a relation of values indicated in the following equation (that is, a voltage value in which the power supply voltage Vcc is subtracted by a driving voltage applied to both ends of the motor 2) among the power supply voltage Vcc supplied by the battery 1, an electro-mechanical load resistance value Rm of the motor 2 and a driving current I energized to the motor 2.

$$Vd = Vcc - Rm.I$$

Therefore, in case that the load resistance Rm of the bower motor 2 is constant, the sensing voltage Vd which is a desired driving voltage is applied to the blower motor 2, so that the number of revolution of the blower motor 2 becomes constant and then a specified amount of air is supplied from the automobile air conditioner into the automobile.

Practically, an air pressure fed from an external part is varied in response to a variation of an automobile speed and the like and an amount of intake air for the automobile air conditioner is increased or decreased, so that the load resistance Rm of the blower motor 2 is decreased or increased and as apparent from the above equation, the sensing voltage Vd is decreased or increased. Then, in case that the sensing voltage Vd is decreased, (a condition in which the load resistance Rm of the motor 2 is increased), an output voltage Vo of the operation amplifier 4 is also apt to increase, so that the driving current I is increased and the sensing voltage Vd which is a potential at the common connection point of the transistor 3 and the motor 2 is increased. In turn, in case that the sensing voltage Vd is increased (a condition in which the load resistance Rm of the motor 2 is decreased), the output voltage Vo of the operation amplifier 4 is also apt to decrease, so that the driving current I is decreased and the sensing voltage Vd which is a potential at the common connection point between the transistor 3 and the motor 2 is decreased. In this way, since a desired driving voltage based on the set voltage Va is always applied to both terminals of the blower motor 2, the blower motor 2 assures a constant number of revolution to supply air into the automobile.

(Problems To Be Resolved By The Invention)

However, if the driving voltage Vd is controlled to have a constant value, a set amount of air under a specified number of revolution of the blower motor 2 is disturbed by an increasing or decreasing of an amount of intake air varied from outside the automobile and then an entire amount of air to be fed out of the automobile air conditioner is varied. Then, in case that an entire amount of air is varied, it shows a problem that an uncomfortable feeling is given to a driver who directly receives air and in addition a sound of blown air from a duct of the automobile air conditioner is varied to generate noise in the automobile.

OBJECT OF THE INVENTION

Therefore, it is a first technical issue of the present invention to provide an apparatus for controlling rotation of a DC motor for a blower capable of assuring a specified amount of blown air by the automobile air conditioner and the like even of a load variation is found in the motor 2.

In addition, it is a second technical issue of the present invention to provide an apparatus for controlling rotation of a DC motor for a blower in which an influence of an off-set voltage (non responsive range) of a signal supplied to the driving means in respect to the sensed signal of means for sensing a driving current and a set signal of the setting means is reduced and it can be selected to the most suitable amount of air as near as possible.

SUMMARY OF THE INVENTION

(Means)

A technical means of the present invention is constructed as indicated in the following description in order to resolve the above-mentioned technical issue.

It is characterized in that the same is comprised of:

a DC motor 2 of which mechanical load is varied;

a DC power supply 1 for supplying an electric current to said DC motor 2;

driving means 3, 12 and 13 for controlling an amount of electric current supplied from DC power supply 1 to said DC motor 2;

electric current sensing means 8 and 9 for sensing an electric current to be supplied to said DC motor 2 corresponding to a controlled condition of each of said driving means 3, 12 and 13 and outputting it as an analogue signal;

setting means 6 for supplying a set value for use in specifying an electric current value to be energized in correspondence with a rotary torque of said DC motor 2 under a comparison with output values from said current sensing means 8 and 9;

discriminating means 11 for comparing output signals from said setting means 6 and said current sensing means 8 and 9 and instructing an electric current to be supplied in correspondence with a rotary torque of said DC motor 2 to said driving means 3, 12 and 13 with an analogue signal;

an insulating means 10 for smoothening a pulsation wave included in outout values from said discriminating means 11 and/or said current sensing means 8 and 9; and attenuating means 14 and 15 for attenuating an output values of at least one of said sensing means 8 and 9 and said discriminating means 11 together with an attenuating characteristic of said integrating means 10 and setting an attenuation amount in correspondence with a voltage amplification degree between said sensing means 8 and 9 and said discriminating means 11 for decreasing an offset amount between said sensing means 8 and 9 and said discriminating means 11; and said offset amount being decreased to cause a minimum set value of an amount of blowing air generated by said DC motor 2 to be decreased.

(Action)

The above-described technical means acts as follows.

That is, a value of the driving current I of the blower motor 2 accepting a variation of the mechanical load is detected, an electro-mechanical load applied to the blower motor 2 is judged to supply a constant driving current to the motor 2 and control the number of revolution of the blower motor 2 in correspondence with a variation of an amount of taken air so as to maintain a specified amount of air blown from the blowing port, so that an uncomfortable feeling of noise and the like are prevented from being applied.

In addition, an offset component included in a driving instruction signal Vp supplied to the driving means 3, 12 and 13 in view of a result of judgement of the sensing signal of the driving current I applied to the blower motor 2 and the setting signal V from the setting means is attenuated by an attenuating means, a rate of amplification of the sensing means and/or discriminating means is set in correspondence with the amount of attenuation to decrease the amount of offset, so that a more accurate amount of blown air can be set and controlled and thus an amount of blown air which is near to the set value having a less difference against the target value is blown out.

BRIEF DESCRIPTION OF THE DRAWINGS

FIGS. 1 to 4 are an illustrative view for showing a first preferred embodiment of the present invention.

FIGS. 5 and 6 are an illustrative view for showing a second preferred embodiment of the present invention.

DETAILED DESCRIPTION

Preferred Embodiment

A first preferred embodiment of the present invention will be described in detail in reference to FIGS. 1 and 2. The same component elements as those of the conventional system are affixed with the same reference numerals and their detailed description will be eliminated.

Figure 1:
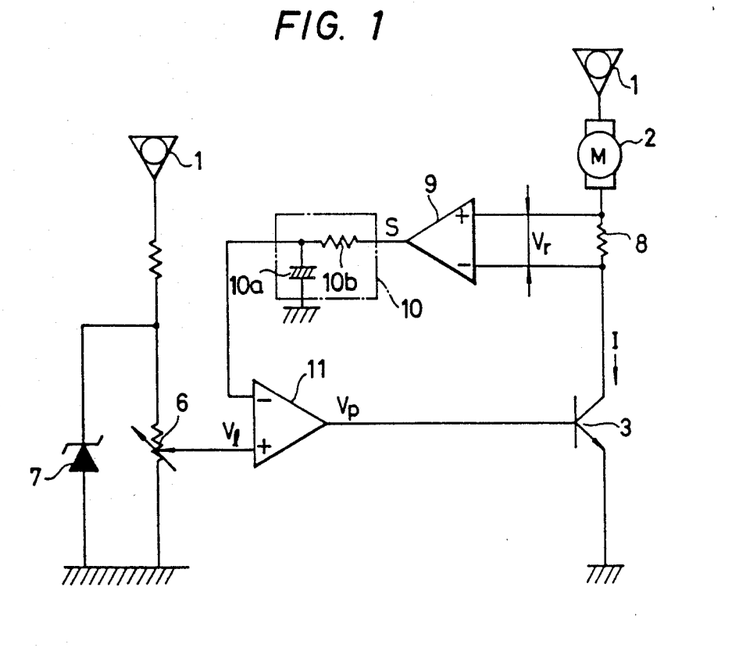
FIG. 1 is a circuit diagram for showing a blower motor driving control device.
Figure 2:
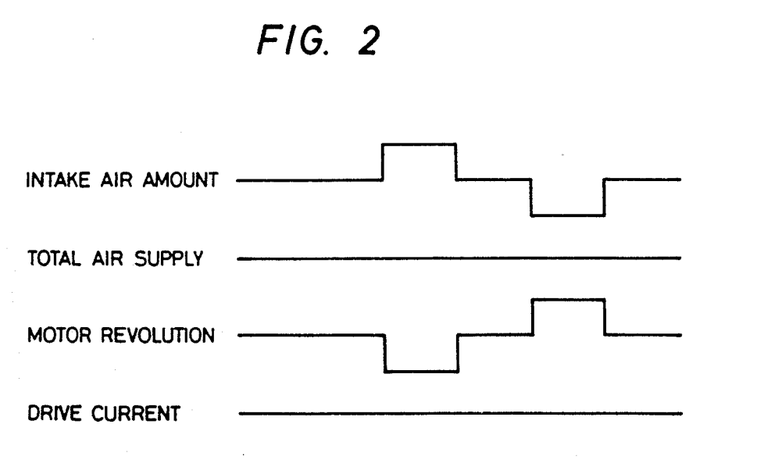
FIG. 2 is a timing chart for showing operation in FIG. 1.

In FIG. 1 is illustrated a circuit configuration of a blower motor driving control device of the present invention and the blower motor 2 to be controlled is connected to a battery 1 and a driving NPN type transistor 3. Between the collector the driving transistor 3 and the blower motor 2 is inserted a driving current sensing resistor 8. To both ends of the resistor 8 are connected a non-inverted input terminal (+) of the operation amplifier 9 for use in amplifying a sensing signal and an inverted input terminal (−), respectively. An output terminal of this operation amplifier 9 is connected to an inverted inout terminal (−) of the operation amplifier 11 for a comparison operation which may act as a discriminating means through the integrating circuit 10. The integrating circuit 10 has a capacitor 10a and a resistor 10b connected in series between an output terminal of the operation amplifier 9 and the ground so as to perform a smooth pulsation of the amplified sensing signal. The non-inverted input terminal (+) of the operation amplifier 11 is connected to a sliding contact terminal of a variable resistor 6 for setting a reference voltage V. To the other fixed terminal of the variable resistor 6 is a common connection point between a resistor for dividing a power supply voltage Vcc and a cathode of Zener diode 7 for stabilizing a set voltage in respect to a variation of the battery 1, and the other fixed terminal of the variable resistor 6 is connected to the cathode of the battery 1 not shown through a ground line and the anode of the Zener diode 7.

Then, operation of the first preferred embodiment will be described, wherein at first, a load resistance Rm of the blower motor 2 while a desired amount of taken air is being kept is constant, and in this case, as apparent from the above equation, a desired driving voltage Vd is applied to the blower motor 2 and a constant driving current I corresponding to a set voltage value V is supplied, so that the number of revolution of the blower motor 2 becomes constant. Thus, as shown in FIG. 2, as for a desired amount of taken air, a total sum of air volume at this time and a set air volume set by the blower motor 2 which is rotated at a constant speed is sent out by the automobile air conditioner.

Then, when an amount of taken air is increased to cause the load resistance Rm of the blower motor 2 to be increased, as apparent from the above equation, the driving current I is decreased, so that a voltage Vr at both ends of the resistor 8 is also decreased. Therefore, since the operation amplifier 9 has an input of the voltage Vr of both ends as a sensing signal, a level of the amplified and outputted sensing signal S is decreased. Thus, since the sensing signal S of which level is decreased is compared with the reference voltage V by the operation amplifier 11, the increased output voltage Vp of the operation amplifier 11 is supplied to the base of the driving transistor 3 as a control signal. As a result, a current between the base and the emitter of the transistor 3 is increased and an impedance between the collector and the emitter is decreased, thereby the driving current I is kept at the desired value corresponding to the target amount of air.

In this case, the driving current I and the torque T of the blower motor 2 are in a proportional relationship and the torque T and the number of revolution of the blower motor 2 are in an inverse proportional relationship. As described above, as the load resistance Rm of the blower motor 2 is increased due to an increased amount of taken air and the driving current I is kept constant, as apparent from the above equation, the voltage Vcc of the battery 1 is constant and then the voltage value applied o both ends of the motor 2 which is a driving voltage is decreased by an amount increased in correspondence with an increased amount of taken air. Thus, the blower motor 2 shows a maintained torque T and only the number of revolution of the blower motor is decreased. Therefore, if the amount of taken air is increased, an amount of air generated by a fan rotated by the blower motor 2 is decreased under influence of the decreased number of revolution of the blower motor 2, resulting in that as shown in FIG. 2, a total amount of air taken from the automobile air conditioner is kept constant on the basis of the set amount of air.

When the intake air decreases and invites a decrease of the load resistance Rm of the blower motor 2, the voltage Vr of the resistor 8 increases in response to an increase of the driving current I so as to decrease the output voltage Vp of the operational amplifier 11. As the result, the driving current I from the driving transistor 2 is maintained at a fixed value. With the decrease of the load resistance Rm, the driving voltage Vd increases as calculated from the equation, and increases the number of revolutions of the blower motor 2. Therefore, the total air supply from the air conditioner is similarly maintained at a fixed amount.

Figure 3:
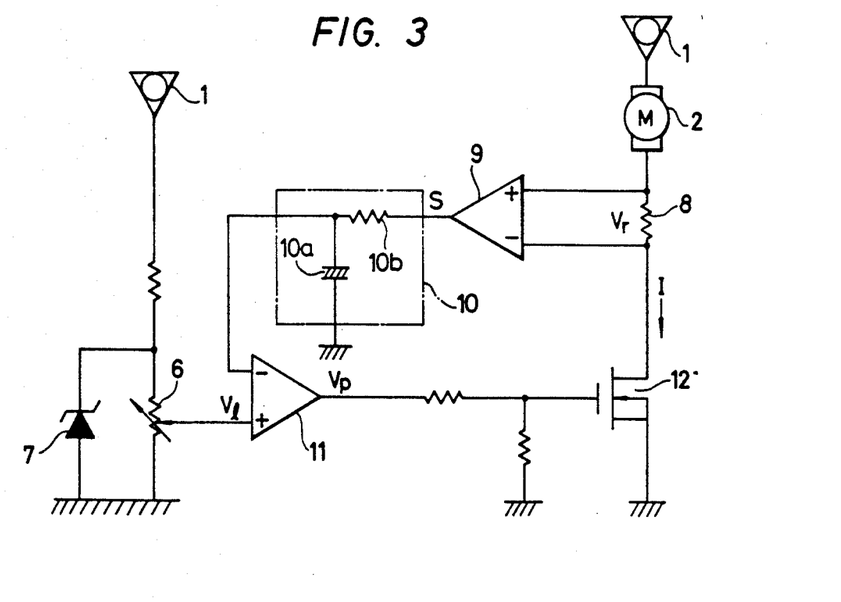
FIG. 3 is a circuit diagram for showing another preferred embodiment of FIG. 1.

In FIG. 3 is illustrated a modified embodiment of the first preferred embodiment. That is, in this example, MOS type FET 12 of N channel is used in place of the driving NPN bipolar transistor 3 and to its gate is supplied an output voltage Vp of the operation amplifier 11 through an attenuating means forming a voltage divider circuit connected in series with or in parallel so as to set a level of the supplying signal and an input impedance. Even in this preferred embodiment, it is operated in the same manner as that described in reference to FIG. 1.

Figure 4:
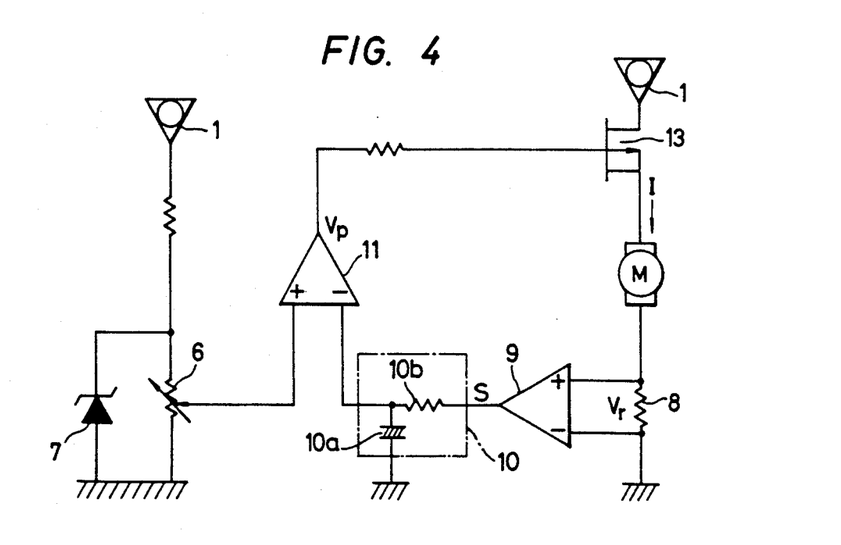
FIG. 4 is a circuit diagram for showing a still further preferred embodiment of FIG. 3.

In FIG. 4 is illustrated a still further modified example of the preferred embodiment shown in FIG. 1 and FIG. 3, P-channel MOS type FET 13 is arranged between the battery 1 and the blower motor 2, and the blower motor 2 is connected to the ground through a resistor 8 for use in sensing a current. Also in this preferred embodiment, it is operated in the same manner as that of the preferred embodiment shown in FIG. 1 and FIG. 3.

Figure 6:
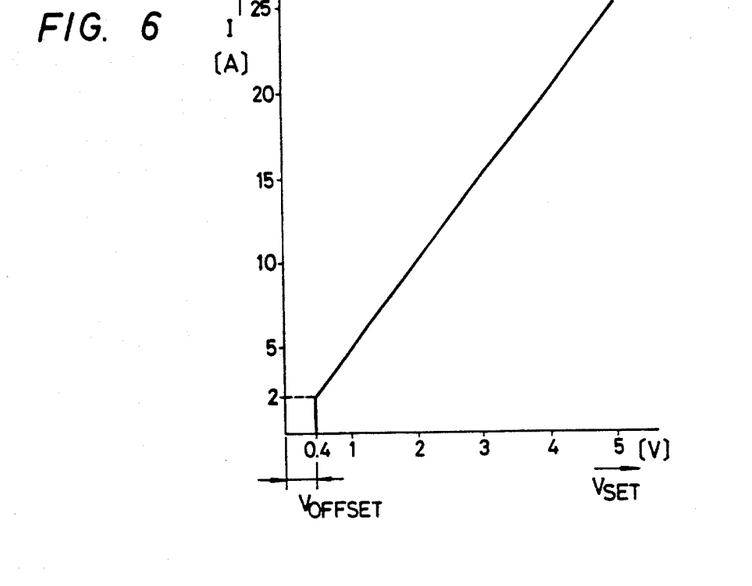
FIG. 6 is an operative characteristic view for showing operation of FIG. 5.

However, since the operation amplifier 9 for use in amplifying a sensing signal Vr of a current value under an arrangement illustrated in reference to FIG. 1 is operated only with an anode voltage Vcc of the battery 1 mounted on an automobile for supplying a limited energizing voltage, offset voltage is easily generated to the amplifying signal $V_{SET}$. The value of this offset voltage is about 0.4 V as shown in FIG. 6 as one example in case that a power supply voltage of about 5V is supplied to the operation amplifier 9 with the power supply voltage Vcc being 12V, for example. If a degree of amplification of a voltage of the operation amplifier is 100 times, a non-desired offset voltage which does not contribute to an output of the operation amplifier 9 with a potential Vr at both ends divided by the resistor 8 for use in sensing a current less than 4mV is generated. In this case, if it is assumed that a value of the resistor 8 is set at 2mω, an offset voltage corresponding to a value less than 2A of the driving current is outputted at an amplifying signal Vset from the operation amplifier 9. As a result, the blower motor driving device for the automobile air conditioner has a disadvantage in view of a minimum adjusting range in which the adjustment may not be performed within a narrower range than an amount of air in which the driving current I from the transistor 3 acting as the driving means corresponds to 2A. Further, a degree of voltage amplification of the operation amplifier 11 performing a differential amplification acting as a discriminating means shall be set by one time.

In order to improve this disadvantage, the blower motor driving device for the automobile air conditioner of the second preferred embodiment is constructed such that a sensing resistor 8 for use in sensing a driving current and driving means 3, 12 and 13 for use in adjusting a driving current value are connected in series with the DC power supply 1 at the driving current passage of the blower motor, the amplified signal Vset having a potential at both ends of the sensing resistor 8 amplified by an amplifying means and the reference signal V are compared by a comparing means 11, said control means 3, 12 and 13 are adjusted in response to the comparison signal so as to keep the driving current constant, a voltage dividing means is provided for dividing the amplifying voltage Vset, decreasing an offset amount and narrowing a minimum adjusting range.

A second preferred embodiment of the present invention will be described in detail in reference to FIG. 5.

Figure 5:
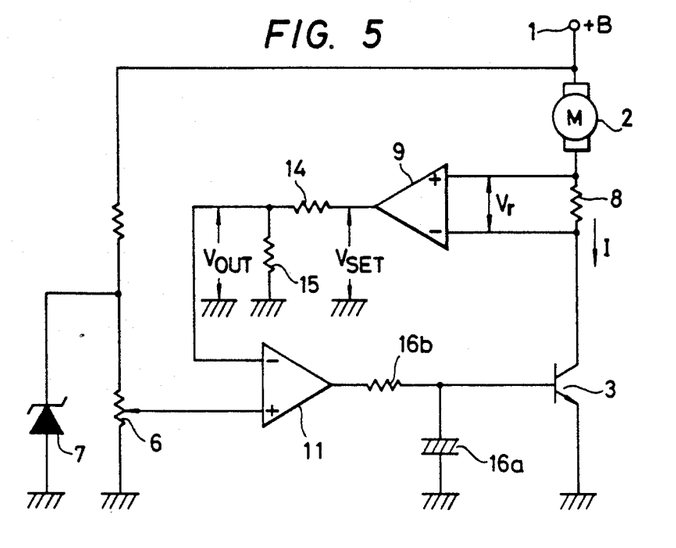
FIG. 5 is a circuit diagram for showing a blower motor driving control device.

FIG. 5 is a circuit diagram for showing one example of a blower motor driving device for an automobile air conditioner. The same portions or parts illustrated in the first preferred embodiment are affixed with the same reference numerals and its detailed description will be eliminated.

The constitution shown in FIG. 5 has the following difference in respect to the first preferred embodiment.

At first, a resistor 14 is arranged in series between an output terminal of the operation amplifier for carrying out an amplification action of the sensing means and a non-inverse input terminal of the operation amplifier 11 for comparing and amplifying operation acting as a discriminating means. The inverse input terminal of this operation amplifier is connected to the ground through a resistor 15. These resistors 14 and 15 are formed as a voltage dividing means for dividing an amplifying signal Vset. A degree of amplification of a total voltage corresponding to an amount of attenuation set by a resistance ratio made by this voltage dividing means is set higher by a magnification in which the resistance value of the resistor 8 for use in sensing a current corresponds to the amount of attenuation in case that, for example, a degree of amplification of voltage of the operation amplifier 9 and the operation amplifier 11. Further, to the output terminal of the operation amplifier is connected the base of the transistor 3 acting as a control means through a resistor 16b. These capacitor 16a and the resistor 16b are constituted as an integrating means for smoothening the pulsation components less than the desired period from the output voltage of the operation amplifier 11.

Then, in case that the resistors 14 and 15 have the same resistance value in order to decrease the offset voltage to its half value, for example, the voltage is divided into the half voltage value ($\frac{1}{2}$) of the amplifying signal $V_{SET}$ of the operation amplifier 9 and attenuated and a degree of amplification of the voltage of the operation amplifier 9 is similar 100 times, a resistance value of the resistor 8 for sensing the driving current I is set to 4mΩ of two times.

Under this set condition, when driving current I is energized at 1A and a potential Vr at both ends of the sensing resistor 8 of which resistance value is set to 4mΩ is 4 m , a maximum offset voltage of 0.4 V is present at the amplifying signal Vset of the operation amplifier 9. Therefore, if the driving current I is in a range of more than 1A, the operation amplifier 9 may output the amplifying signal $V_{SET}$ corresponding to a variation of the driving current value. This amplifying signal $V_{SET}$ is divided into a half value by the voltage dividing means and supplied to the inverse input terminal (−) of the comparing operation amplifier 11 as a voltage dividing signal $V_{OUT}$. This voltage dividing signal $V_{OUT}$ is the same value as that of the amplifying signal S described in reference to the above-described FIG. 1 within a range of target value of the offset voltage from the amplifying operation amplifier 9 if the driving current I is the same.

Therefore, in the preferred embodiment shown in FIG. 5, it shows a half range of influence of the offset voltage of the amplifying operation amplifier 9 as compared with that of the preferred embodiment shown in FIG. 1. This is not limited to the offset voltage of the amplifying operation amplifier 9 and in case that a degree of voltage amplification over one time is set to a comparing operation amplifier 11, as shown in the preferred embodiment of FIG. 3, a comparing output signal of the comparing operation amplifier 11 is divided by an attenuating means and supplied to the driving means, the set voltage value V from the variable resistor 6 acting as the setting means at this time is set to a larger value in correspondence with an amount of attenuation at this time and a range of variation of output from the sensing means and then it is apparent that the same action as that of decreasing an influence of the offset voltage described in reference to FIG. 5 can be attained.

In the above-described preferred embodiment, a ratio of voltage division of a voltage dividing circuit acting as an attenuating means is set to have $\frac{1}{2}$ so as to decrease the offset value in half. However, it is apparent that this is not limited to this attenuation value. It is also apparent that a degree of amplification of voltage of the amplifying operation amplifier 9 or the like is increased without increasing the value of resistance of the sensing resistor 8 in correspondence with this amount of attenuation.

The setting means for specifying the above-mentioned amount of blown air has been described as a discrete component such as the variable resistor 8 and Zener diode 7 or the like. However, it is a matter of changing in design which can easily be performed by those skilled in the art that the setting means is not limited to this means, but the set data value got by a micro-processor is converted into an analogue value by a digital-analogue converter, thereby an external set value or the like is digitized by supplying the analogue value to the non-inverse input terminal (+) of the operation amplifier 11.

(Effects of the Invention)

The above-described invention has the following superior effects.

Even in case that the driving current I of the blower motor 2 of the present invention is sensed and the load resistance Rm of the blower motor 2 is varied, a specified driving current I is supplied to the motor 2 and the number of revolution of the blower motor 2 is varied in correspondence with a variation of a mechanical load amount such as an amount of taken air to control a rotational torque, so that an amount of air from the blowing port of the automobile air conditioner or the like is not varied under variation of the amount of taken air acting as an external cause, and a specified amount of air can always be attained in correspondence with the set amount of air. Thus, it is possible to restrict noise from being generated under variation of an amount of blown air without giving any uncomfortable feeling to the driver or the like under variation of an amount of air.

Since the offset voltage value included in an output value from the discriminating means for instructing the driving current I which can not be corresponded with the setting means or sensing means is applied as a low value with the attenuating means and the set values of each of the portions is corresponded with the attenuation value, it shows some effects of not only enabling of a smooth setting of amount of blown air without determining substantial minimum range of the set amount of air to be blown, but also capable of controlling it to a quite near value to the actual required amount of air and so an air adjusting energy for useless air can be saved.

What is claimed is:

1. A motor drive circuit for a DC motor on which the mechanical load is varied and which is powered by a supply supplying an electric current to the DC motor, comprising:
   a drive transistor for controlling the electric current supplied from the power supply to the DC motor;
   a current sensing resistor for detecting the electric current supplied to the DC motor and providing an analog voltage, current value signal indicative thereof;
   amplifier means connected to both ends of said current sensing resistor for amplifying the current value signal of said current sensing resistor and providing an amplified current value signal, said amplifier means having a characteristic of producing an offset voltage signal below an offset level of said amplifier means due to an inter-terminal potential difference of said amplifier means;
   comparison means responsive to the current value signal obtained from said amplifier means for comparing the current value signal to a reference current value signal and providing a desired current value signal to said drive transistor for controlling the electric current supplied to the DC motor so as to compensate for mechanical load variations;
   setting means for providing a reference current value signal to said comparison means; and
   a voltage divider connected between said amplifier means and said comparison means for dividing the amplified current value signal of said amplifier means and providing a divided current value signal as an output to said comparison means which is a predetermined fractional amount of the amplified current value signal, wherein the range of the current value signal detected by said current sensing resistor which is affected by the offset voltage level of said amplifier means is decreased by said fractional amount.

2. The motor drive circuit of claim 1 further comprising an integrator connected between said comparison means and said drive transistor.

* * * * *

UNITED STATES PATENT AND TRADEMARK OFFICE
CERTIFICATE OF CORRECTION

PATENT NO. : 4,933,614
DATED : June 12, 1990
INVENTOR(S) : Toshihiko Kawata

It is certified that error appears in the above-identified patent and that said Letters Patent is hereby corrected as shown below:

Title page should include citation to prior Japanese Patent Applications as follows:

Item [30]      Foreign Application Priority Data

April 2, 1986    Japan . . . . . . . . . . 49899/86
    July 28, 1986    Japan . . . . . . . . . . 115427/86

Signed and Sealed this

Twenty-fourth Day of August, 1993

Attest:

BRUCE LEHMAN

*Attesting Officer*    *Commissioner of Patents and Trademarks*